US010753772B2

(12) United States Patent
Yamamoto

(10) Patent No.: US 10,753,772 B2
(45) Date of Patent: Aug. 25, 2020

(54) RESOLVER HAVING DECREASED PERMANENCE ERROR DUE TO HARMONIC COMPONENTS

(71) Applicant: MABUCHI MOTOR CO., LTD., Chiba (JP)

(72) Inventor: Shigeru Yamamoto, Chiba (JP)

(73) Assignee: MABUCHI MOTOR CO., LTD., Chiba (JP)

(*) Notice: Subject to any disclaimer, the term of this patent is extended or adjusted under 35 U.S.C. 154(b) by 0 days.

(21) Appl. No.: 15/995,160

(22) Filed: Jun. 1, 2018

(65) Prior Publication Data

US 2019/0033098 A1 Jan. 31, 2019

(30) Foreign Application Priority Data

Jul. 31, 2017 (JP) .................................. 2017-147850

(51) Int. Cl.
| G01D 5/24 | (2006.01) |
| G01D 5/244 | (2006.01) |
| G01D 5/20 | (2006.01) |
| H02K 11/225 | (2016.01) |

(52) U.S. Cl.
CPC ........... *G01D 5/2448* (2013.01); *G01D 5/204* (2013.01); *G01D 5/2046* (2013.01); *H02K 11/225* (2016.01); *G01D 5/24433* (2013.01)

(58) Field of Classification Search
CPC .... H02K 11/20; H02K 11/215; H02K 11/225; G01D 5/2448; G01D 5/204
USPC ............................................. 310/68 B, 68 R
See application file for complete search history.

(56) References Cited

U.S. PATENT DOCUMENTS

| 5,446,966 A | 9/1995 | Ishizaki |
| 5,448,535 A * | 9/1995 | Fujita ................. G11B 11/10576 369/120 |
| 6,433,536 B1 * | 8/2002 | Yundt ..................... G01D 5/145 324/207.2 |

(Continued)

FOREIGN PATENT DOCUMENTS

| JP | 3309025 B2 | 7/2002 |
| JP | 2013-221774 A | 10/2013 |
| JP | 2015-175703 A | 10/2015 |

OTHER PUBLICATIONS

Kamabuchi et al., English Machine Translation of JP 3309025 B2 (Year: 1994).*

(Continued)

*Primary Examiner* — Tulsidas C Patel
*Assistant Examiner* — Rashad H Johnson
(74) *Attorney, Agent, or Firm* — Hauptman Ham, LLP

(57) ABSTRACT

A resolver includes a resolver rotor fixed to a rotating shaft, and a resolver stator disposed around the resolver rotor. The resolver stator includes an annular stator core having a plurality of salient poles which protrudes radially inward and which is disposed at regular intervals in a circumferential direction. The resolver rotor has an outer peripheral surface defined by an outer radius $Rm(\varphi)$ which is obtained by blending, with respect to a first function $Gp(\varphi)$ where an air gap between the resolver rotor and the salient poles is proportional to a sine wave ($\sin \varphi$) related to an angle $\varphi$ of the resolver rotor, a second function $Gip(\varphi)$ where the inverse of the air gap is proportional to the sine wave ($\sin \varphi$), at a predetermined ratio $\alpha$.

5 Claims, 5 Drawing Sheets

(56) References Cited

U.S. PATENT DOCUMENTS

| | | | |
|---|---|---|---|
| 7,148,599 B2 | 12/2006 | Aoyama et al. | |
| 2005/0023921 A1* | 2/2005 | Kobayashi | H02K 24/00 |
| | | | 310/168 |
| 2005/0212511 A1* | 9/2005 | Kujirai | G01D 5/2046 |
| | | | 324/207.25 |
| 2005/0269895 A1* | 12/2005 | Innami | B62D 5/0403 |
| | | | 310/429 |
| 2006/0220481 A1* | 10/2006 | Takekawa | H02K 11/225 |
| | | | 310/90.5 |
| 2018/0248501 A1* | 8/2018 | Hoshino | H02P 6/17 |
| 2019/0089275 A1* | 3/2019 | Ashida | B60L 50/50 |

OTHER PUBLICATIONS

Office Action in CN Application No. 201810846446.4, dated Dec. 18, 2019, 14pp.

\* cited by examiner

RESOLVER HAVING DECREASED PERMANENCE ERROR DUE TO HARMONIC COMPONENTS

RELATED APPLICATIONS

The present application claims priority to Japanese Application Number 2017-147850 filed Jul. 31, 2017, the disclosure of which is hereby incorporated by reference herein in its entirety.

BACKGROUND

1. Technical Field

The present invention relates to a resolver for detecting the rotation angle of a motor, and a motor equipped with the resolver.

2. Description of the Related Art

Conventionally, a motor (particularly, a brushless motor) may be fitted with a detector (sensor) for detecting the number of revolutions or rotation angle (rotation position) of the motor. An example of the detector is a resolver. A resolver has high angular resolution and is highly robust, and is therefore being used in vehicle driving motors and power steering motors, for example. A known resolver configuration includes, e.g., a resolver rotor which rotates with the rotating shaft of the motor, and a resolver stator having a plurality of salient poles each with an exciting coil and two output coils wound thereon (see Japanese Patent No. 3309025).

In the resolver described in Japanese Patent No. 3309025, the resolver rotor is eccentric by a predetermined amount with respect to the rotating shaft. The resolver rotor has an outer peripheral shape provided with recesses and protrusions at a plurality of locations which are smaller than the amount of eccentricity with respect to a true circle, in order to cancel out a permeance error (harmonic distortion) in a detected waveform (output waveform from a detection coil). In Japanese Patent No. 3309025, it is indicated that the shape of the resolver rotor makes it possible to increase the amplitude of the fundamental wave component of the detected waveform, while reducing the permeance error included in the detected waveform.

SUMMARY

It is known that permeance is substantially proportional to the inverse of the gap (hereafter referred to as "air gap") between the salient poles of the resolver stator and the outer peripheral surface of the resolver rotor. However, in Japanese Patent No. 3309025, the resolver rotor is formed with an outer peripheral shape in which an N-order waveform corresponding to the permeance error component to be reduced (such as a third-order component and a fifth-order component) is superimposed, regardless of the size of the air gap. As a result, depending on the size of the air gap, the effect illustrated in FIG. 3 of Japanese Patent No. 3309025 may not be obtained. Thus, in order to decrease the error (permeance error) due to the harmonic components of an output waveform (resolver signal) regardless of the size of air gap, further improvements are required.

The subject resolver has been devised in view of the above problem, and an object of the resolver is to improve the accuracy of rotation angle detection by reducing an error due to harmonic components of a resolver signal. An object of the subject motor is to implement various controls with high accuracy. The subject matter is not limited to the above objects, and includes an object to obtain an operation/effect that can be derived from the various configurations of the embodiments of the invention, as will be described below, which cannot be obtained by conventional technology.

(1) A resolver disclosed herein includes a resolver rotor fixed to a rotating shaft; and a resolver stator disposed around the resolver rotor. The resolver stator includes an annular stator core which has a plurality of salient poles protruding radially inward and which is disposed at regular intervals in a circumferential direction; and the resolver rotor has an outer peripheral surface defined by an outer radius obtained by blending, with respect to a first function where an air gap between the resolver rotor and the salient poles is proportional to a sine wave related to an angle of the resolver rotor, a second function where an inverse of the air gap is proportional to the sine wave, at a predetermined ratio. The angle is not a rotation angle of the resolver rotor but an angle for determining the outer radius of the resolver rotor (angle from the center of rotation of the shaft; i.e., an angle in polar coordinates).

(2) Preferably, the ratio may be set greater than zero, and may be set to a greater value as a modulation factor representing a variable amplitude of an output signal from the resolver with respect to an average value of the output signal becomes smaller.

(3) Preferably, the ratio may be set to a value not less than 0.2 and not more than 1.0.

(4) Preferably, the outer radius may be calculated according to an expression (A) indicated below, based on the angle, a stator inner radius indicating a length from the center of rotation of the shaft to a radially inner end face of the salient poles, the ratio, and a maximum value and a minimum value of the air gap set in advance.

$$Rm(\phi) = Rs - \{\alpha \times Gip(\phi) + (1-\alpha) \times Gp(\phi)\} \quad (A)$$

$$Gp(\phi) = \{(G\max - G\min)\sin\phi\}/2 + (G\min + G\max)/2$$

$$Gip(\phi) = \cfrac{1}{\left[\left\{\cfrac{\cfrac{1}{G\min} - \cfrac{1}{G\max}}{2}\right\}\sin\phi + \cfrac{\cfrac{1}{G\min} + \cfrac{1}{G\max}}{2}\right]}$$

Rm(φ): Outer radius
φ: Polar coordinate angle of resolver rotor outer radius
Rs: Stator inner radius
α: Ratio
Gp(φ): First function
Gip(φ): Second function
Gmax: Maximum value of air gap
Gmin: Minimum value of air gap (5) Preferably, the resolver may have an axial double angle of 1.

(6) A motor disclosed herein includes a housing; the resolver according to any one of (1) to (5); a rotor integrally rotated with the shaft; and a stator fixed to the housing.

According to the resolver of the disclosure, the outer peripheral surface of the resolver rotor is defined by an outer radius obtained by appropriately blending a second function with respect to a first function at a predetermined ratio, whereby an output waveform close to an ideal inductance waveform without harmonic components can be obtained. As a result, the error due to the harmonic components of the resolver signal can be decreased, and the accuracy of rotation angle detection can be improved.

According to the motor of the disclosure, various controls, such as position control and speed control, can be implemented with high accuracy.

DESCRIPTION OF THE EMBODIMENTS

With reference to the drawings, a resolver and a motor according to embodiments will be described. The embodiments are described merely by way of example, and are not intended to exclude the application of various modifications or techniques which are not explicitly indicated in the embodiments. The configurations of the various embodiments may be variously modified and implemented without departing from the spirit and scope of the embodiments. The configurations may be omitted or selected as needed, or combined as appropriate.

1. Configuration 1-1. Basic Structure of Resolver

A resolver of the present disclosure is a variable reluctance (VR) resolver in which a resolver rotor has a cylindrical outer peripheral surface which opposes each of salient poles of a resolver stator. The cylindrical outer peripheral surface is configured such that its distance from the center of rotation of the shaft periodically varies in the circumferential direction. The resolver detects a rotation angle based on a variation in an output signal from the resolver (hereafter referred to as a resolver signal) due to a change in the distance (air gap) between the radially inner end face of the salient poles and the cylindrical outer peripheral surface of the resolver rotor. In the following descriptions, "a number of revolutions" refers to a number of revolutions per unit time and is equivalent to a rotational speed.

Figure 1:
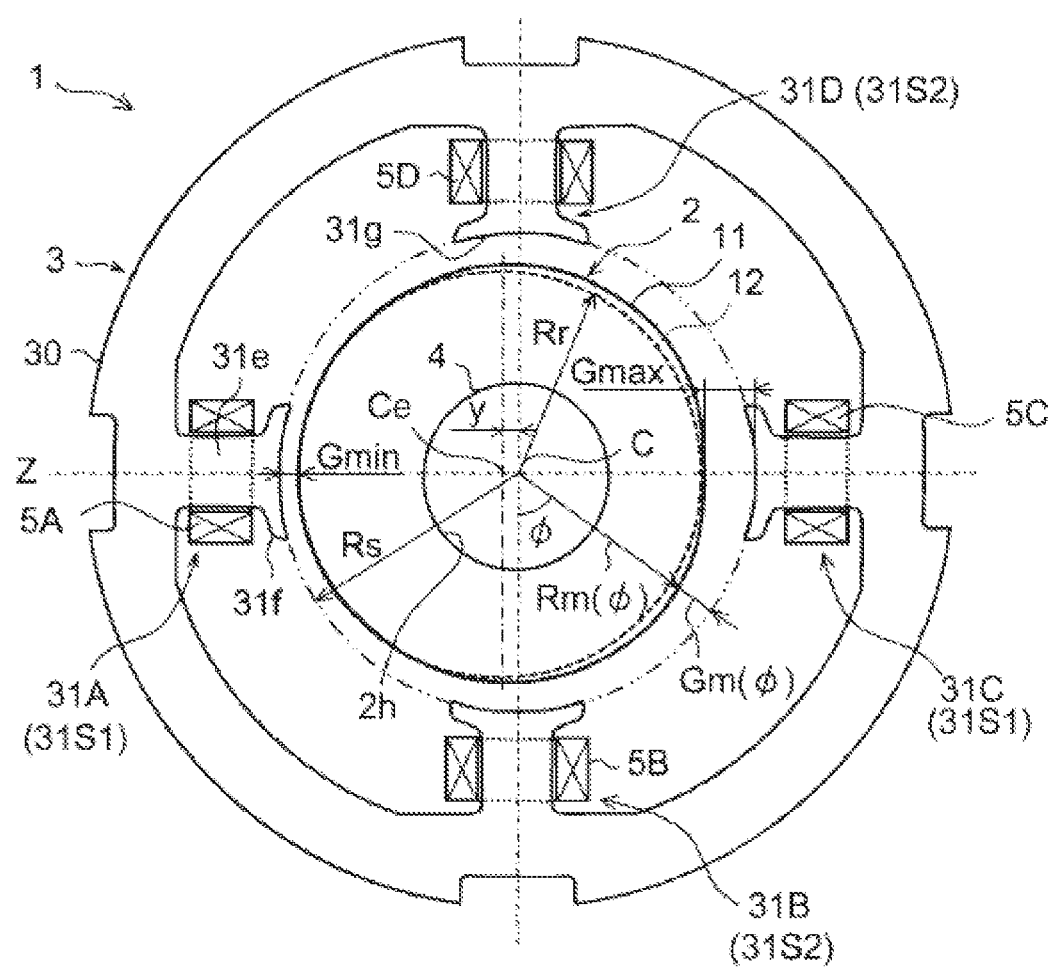
FIG. 1 is a schematic plan view of a resolver according to an embodiment as viewed from an axial direction, with only a shaft illustrated in cross section.
Figure 2:
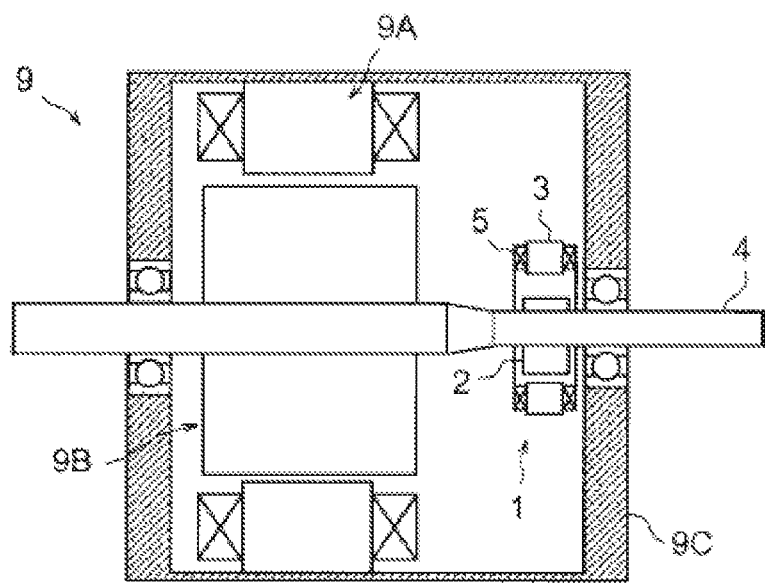
FIG. 2 is a schematic cross sectional view of a motor according to an embodiment.

FIG. 1 is a schematic plan view of a resolver 1 according to the present embodiment as viewed from an axial direction, in which only a shaft 4 (rotating shaft) is illustrated in cross section. In FIG. 1, hatching for the shaft 4 is omitted. The resolver 1 of the present embodiment is assembled in a motor 9 illustrated in FIG. 2, for example. The motor 9 is a brushless motor (such as a servo motor) which includes a stator 9A fixed to a housing 9C, a rotor 9B which rotates with the shaft 4, and a resolver 1 disposed in the housing 9C. The resolver 1 is disposed on the shaft 4 of the motor 9 to detect the rotation angle (rotation position) of the motor 9. In the present embodiment, the resolver 1 has an axial double angle of 1 (resolver 1 with "1× structure") by way of example.

As illustrated in FIG. 1, the resolver 1 is fixed to the shaft 4 that rotates. The resolver 1 includes a resolver rotor 2 with a cylindrical outer peripheral surface 11 of which the distance from a rotation center C of the shaft 4 periodically varies in a circumferential direction, and an annular resolver stator 3 having coils 5 wound thereon. The outer peripheral surface 11 of the resolver rotor 2 has a shape of which the distance from the central axis Ce is displaced from a certain reference cylindrical surface 12 (indicated by a dashed line in FIG. 1). In the following, as viewed from the axial direction (in an axial view), the radius Rr of the reference cylindrical surface 12 (eccentric circle) indicated by the dashed line will be referred to as "rotor reference radius Rr". The shape of the outer peripheral surface 11 of the resolver rotor 2 will be described later. In the present embodiment, the resolver 1 has a 1× structure. Accordingly, the resolver rotor 2 is eccentrically disposed with respect to the rotation center C. Hereafter, the central axis Ce of the reference cylindrical surface 12 will be referred to as "eccentric axis Ce".

The resolver rotor 2 has a circular mounting hole 2h formed at the center for fitting the shaft 4. The circular mounting hole 2h has a central axis aligned with the rotation center C. In the present embodiment, the resolver rotor 2 is configured from a lamination of a plurality of ring-shaped thin plates (such as steel plates) of ferromagnetic material. For example, the resolver rotor 2 is configured by pressing thin plates having a circular hole at the center, and laminating a plurality of thin plates of the same shape.

As illustrated in FIG. 1, the resolver stator 3 includes a substantially ring-shaped stator core 30 with a plurality of salient poles 31 protruding radially inward. In the present embodiment, four salient poles 31A to 31D of the same shape are disposed at regular intervals (90° phase intervals) in a circumferential direction. Each of the salient poles 31A to 31D includes a radially extending tooth 31e and a wide, radially extending wall portion 31f disposed at the radially inner end of the tooth 31e. The salient poles 31A to 31D are substantially T-shaped as viewed in plan.

On the teeth 31e of the four salient poles 31A to 31D, coils 5A to 5D are wound, respectively. The coils 5A to 5D are input coils to which electric current is applied. The coils 5A to 5D are configured from the same winding wires and have the same number of turns. Between adjacent salient poles 31, the coils 5A to 5D are wound in the opposite directions. The wall portions 31f are the portions subjected to magnetic flux. The wall portions 31f extend on both sides along the circumferential direction (rotation direction) from the radially inner end of the teeth 31e. The wall portions 31f have the same length in the rotation direction.

Each of the salient poles 31 has a radially inner end face 31g (surface of the wall portions 31f facing radially inward) which is positioned on a circle with a radius Rs about the rotation center C, as indicated by a dashed and double-dotted line in FIG. 1. That is, in the present embodiment, the end faces 31g of the salient poles 31 are disposed at the same distance from the rotation center C, forming arcs about the rotation center C. Hereafter, the radius Rs will be referred to as "stator inner radius Rs". Between each of the end faces 31g and the outer peripheral surface 11 of the resolver rotor 2, an air gap is provided.

1-2. Circuit Configuration of Resolver

Figure 3:
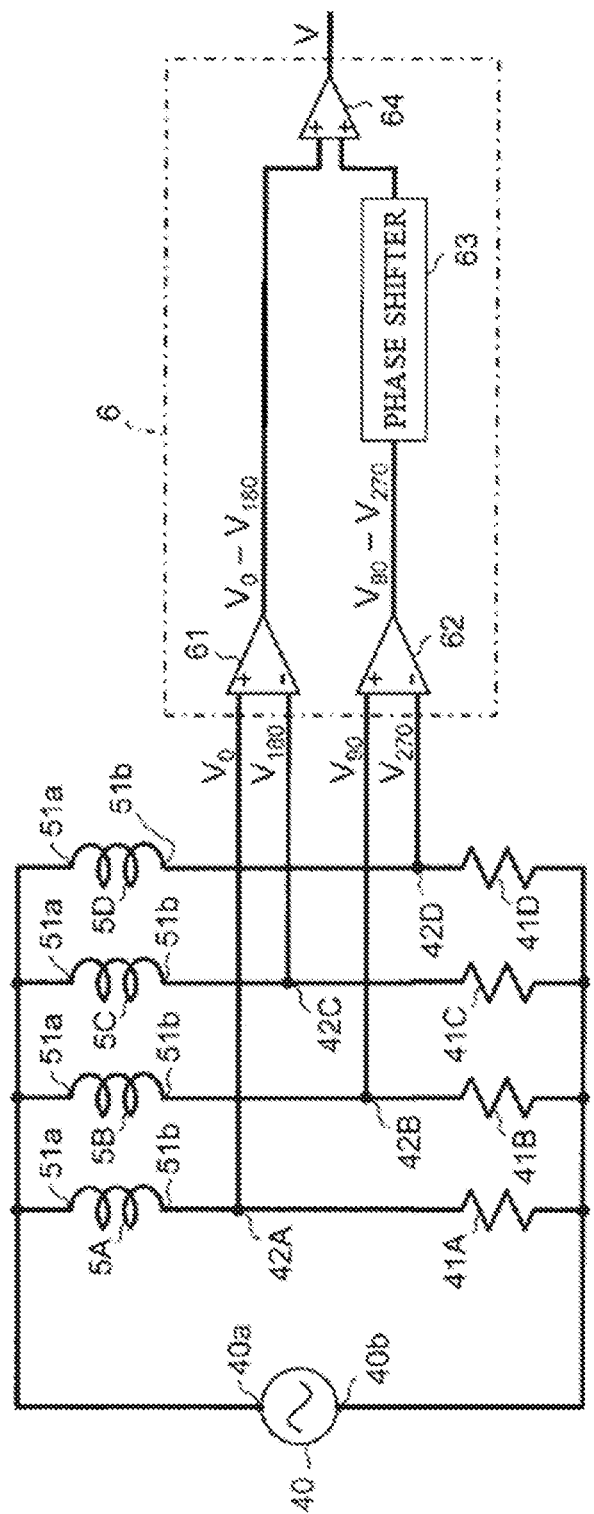
FIG. 3 is a circuit diagram of an electric system configuration of the resolver illustrated in FIG. 1.

As illustrated in FIG. 3, one end 51a of the winding wires of the coils 5A to 5D for the input to the salient poles 31A to 31D is connected to one terminal 40a of an AC current source 40. The other end 51b of the winding wires of the coils 5A to 5D is connected to the other terminal 40b of the AC current source 40 via shunt resistors 41A to 41D, respectively. Between the coils 5A to 5D and the corresponding shunt resistors 41A to 41D, output terminals 42A to 42D are provided, respectively.

In the illustrated example, a sine wave signal is output from the output terminal 42A of the coil 5A; from the output terminal 42C of the coil 5C, a sine wave signal of the opposite phase from that of the output terminal 42A is output; from the output terminal 42B of the coil 5B, a cosine wave signal is output; and from the output terminal 42D of the coil 5D, a cosine wave signal of the opposite phase from that of the output terminal 42B is output.

The sine wave signals and the cosine wave signals output from the output terminals 42A to 42D of the coils 5A to 5D are input to a resolver-digital (R/D) converter unit 6. The R/D converter unit 6 includes an operational amplifier 61 as a first differential amplifier, an operational amplifier 62 as a second differential amplifier, a phase shifter 63, and an adder 64. The adder 64 is followed by an A/D conversion device (not illustrated) for digital conversion of an input analog signal for various processing.

The salient pole 31A and the salient pole 31C with the coils 5A, 5C, both outputting sine wave signals, are arranged at 180-degree phase displacement from each other, forming a first salient pole pair 31S1 (see FIG. 1). The output terminal 42A of the coil 5A of the salient pole 31A is connected to the positive input terminal of the operational amplifier 61. The output terminal 42C of the coil 5C of the salient pole 31C is connected to the negative input terminal of the operational amplifier 61.

Similarly, the salient pole 31B and the salient pole 31D with the coils 5B, 5D, both outputting cosine wave signals, are arranged at 180-degree phase displacement from each other, forming a second salient pole pair 31S2 (see FIG. 1). The output terminal 42B of the coil 5B of the salient pole 31B is connected to the positive input terminal of the operational amplifier 62. The output terminal 42D of the coil 5D of the salient pole 31D is connected to the negative input terminal of the operational amplifier 62.

The phase shifter 63 is connected to the output terminal of the operational amplifier 62 to perform a 90-degrees phase shift. The output terminal of the operational amplifier 61 is connected to a first input terminal of the adder 64. The output terminal of the phase shifter 63 is connected to a second input terminal of the adder 64.

In the R/D converter unit 6, the following processing is performed.

1-3. Processing by Resolver Circuit

The resolver signals (shunt voltage) V output from the output terminals 42A to 42D include error components due to harmonic components of the resolver signals.

When the resolver signal output from the output terminal 42A is $V_0$; the resolver signal output from the output terminal 42B is $V_{90}$; the resolver signal output from the output terminal 42C is $V_{180}$; and the resolver signal output from the output terminal 42D is $V_{270}$, expressions (1) to (4) indicated below hold with respect to the resolver signals $V_0$, $V_{180}$, $V_{90}$, and $V_{270}$ from the output terminals 42A, 42C, 42B, and 42D.

In expressions (1) to (4), a is the average value of the resolver signal; b is the variable amplitude of the resolver signal; c is the variable amplitude of the second-order harmonic component of the resolver signal; d is the variable amplitude of the third-order harmonic component of the resolver signal; and $\theta$ is, as illustrated in FIG. 1, the rotation angle with reference to the reference position at 0 degree of the resolver rotor 2. The rotation angle $\theta$ can be expressed by the value of time integration of the angular velocity wm of the resolver rotor 2 (motor 9) (product of angular velocity $\omega m$ and time t: $\omega mt$). While there are harmonic components of the fourth and subsequent orders, these harmonic components are omitted because their amplitudes are small with limited influence.

The symbol we represents the angular velocity corresponding to the frequency fe of the exciting power supply ($\omega e = 2\pi fe$), and t is the time from the reference point in time. The frequency fe may be set at 5 kHz, for example.

A sine wave voltage due to error component and the voltage of a true sine wave (which may be hereafter referred to as fundamental wave) corresponding to a change in gap G has a phase difference $\alpha$.

$$V_0 = (a + b \cdot \sin \theta + c \cdot \sin 2\theta + d \cdot \sin 3\theta + \ldots) \cdot \sin \omega et \quad (1)$$

$$V_{180} = (a - b \cdot \sin \theta + c \cdot \sin 2\theta - d \cdot \sin 3\theta + \ldots) \cdot \sin \omega et \quad (2)$$

$$V_{90} = (a + b \cdot \cos \theta + c \cdot \cos 2\theta - d \cdot \cos 3\theta + \ldots) \cdot \sin \omega et \quad (3)$$

$$V_{270} = (a - b \cdot \cos \theta + c \cdot \cos 2\theta - d \cdot \cos 3\theta + \ldots) \cdot \sin \omega et \quad (4)$$

As noted above, because the influence of the fourth and subsequent order harmonic components are small, and their omission from expressions (1) to (4) yields expressions (1A) to (4A).

$$V_0 = (a + b \cdot \sin \theta + c \cdot \sin 2\theta + d \cdot \sin 3\theta) \cdot \sin \omega et \quad (1A)$$

$$V_{180} = (a - b \cdot \sin \theta + c \cdot \sin 2\theta - d \cdot \sin 3\theta) \cdot \sin \omega et \quad (2A)$$

$$V_{90} = (a + b \cdot \cos \theta + c \cdot \cos 2\theta + d \cdot \cos 3\theta) \cdot \sin \omega et \quad (3A)$$

$$V_{270} = (a - b \cdot \cos \theta + c \cdot \cos 2\theta - d \cdot \cos 3\theta) \cdot \sin \omega et \quad (4A)$$

In the operational amplifier 61, a process of subtracting the respective sides of expression (2A) from the respective sides of expression (1A) is performed. In the operational amplifier 62, a process of subtracting the respective sides of expression (4A) from the respective sides of expression (3A) is performed.

As a result, the odd-order components are cancelled out due to symmetry, so that the output from the operational amplifier 61 becomes as shown on the right-hand side of the next expression (5), and the output from the operational amplifier 62 becomes as shown on the right-hand side of the next expression (6A).

$$V_0 - V_{180} = 2b \cdot \sin \theta \cdot \sin \omega et + 2d \cdot \sin 3\theta \cdot \sin \omega et \quad (5)$$

$$V_{90} - V_{270} = 2b \cdot \cos \theta \cdot \sin \omega et + 2d \cdot \cos 3\theta \cdot \sin \omega et \quad (6A)$$

In the phase shifter 63, the cosine phase of the expression (6A) as the output of the operational amplifier 62 is delay-shifted by the angle $0.5\pi$ (90 degrees) of the AC exciting current. Accordingly, the $\sin \omega et$ of the expression (6A) is shifted to $-\cos \omega et$, and the output from the phase shifter 63 becomes as shown by the next expression (6).

The angular velocity $\omega m$ ($\propto$ rotation frequency fm of motor) that causes a change in the rotation angle $\theta$ of the resolver rotor 2 (motor 9) is sufficiently low compared with the angular velocity $\omega e$ (frequency fe) of the exciting power supply (i.e., $\omega m \ll \omega e$ or $fm \ll fe$). Accordingly, changes in $\sin \theta$ and $\cos \theta$ due to the phase shifter 63 are disregarded.

$$F(V_{90} - V_{270}) = F(2b \cdot \cos\theta \cdot \sin\omega et + 2d \cdot \cos 3\theta \cdot \sin\omega et) \quad (6)$$
$$= -2b \cdot \cos\theta \cdot \cos\omega et - 2d \cdot \cos 3\theta \cdot \cos\omega et$$

In the adder 64, the output from the operational amplifier 61 and the output from the phase shifter 63 are added together. Accordingly, a process of adding the respective sides of expression (5) and the respective sides of expression (6) is performed, whereby the output from the adder 64 becomes as shown on the right-hand side of the next expression (7).

$$(V_0 - V_{180}) + F(V_{90} - V_{270}) = 2b \cdot \sin\theta \cdot \sin\omega et + \quad (7)$$
$$2d \cdot \sin 3\theta \cdot \sin\omega et - 2b \cdot \cos\theta \cdot \cos\omega et - 2d \cdot \cos 3\theta \cdot \cos\omega et$$

In the expression above, ωe is the angular velocity corresponding to the frequency fe of the exciting power supply (ωe=2πfe), and θ is the product of the angular velocity ωm(ωm=2πfm) corresponding to the frequency fm of the resolver rotor 2(motor 9) and the time t(θ=2πfmt). Accordingly, substituting the angular velocities ωe and ωm in expression (7) with the frequencies fe and fm yields the following expression (8).

$$(V_0-V_{180})+F(V_{90}-V_{270})=-2b \cdot \cos 2\pi t(fe+fm)-2d \cdot \cos 2\pi t(fe+3fm) \quad (8)$$

By subjecting the output from the adder 64 to frequency analysis, it becomes possible to detect peaks at fe+fm and fe+3fm. From fe+fm, fe+3fm, and the peak values, it is possible to derive the maximum amplitude |−2b| of the first term [−2b·cos 2πt(fe+fm)] in the right-hand side of expression 8, and the maximum amplitude |−2d| of the second term [−2d·cos 2πt(fe+3fm)] in the right-hand side of expression 8.

The second term [−2d·cos 2πt(fe+3fm)] in the right-hand side of expression (8) is the error component due to a harmonic component (third-order harmonic component) of the resolver signal, and provides an error component in the detection angle of the resolver 1. Hereafter, the detection angular error will be referred to as "angular error". The third-order harmonic component has a correlation with the fourth-order component of the angular error.

As noted above, the amplitudes of the fourth and subsequent order harmonic components are small. Thus, among the odd-order harmonic components, the fifth and subsequent order harmonic components can be disregarded, and how the third-order harmonic component can be reduced is critical for improving the accuracy of rotation angle detection.

1-4. Structure of Resolver Rotor

In the resolver rotor 2 according to the present embodiment, the shape of the outer peripheral surface 11 is appropriately selected so as to reduce the third-order harmonic component. Specifically, the outer peripheral surface 11 of the resolver rotor 2 is defined by an outer radius Rm(φ) which is obtained by blending, with respect to a first function Gp(φ) where the air gap is proportional to a sine wave with respect to angle φ of the resolver rotor 2 (namely, "sin φ"), a second function Gip(φ) where the inverse of the air gap is proportional to the sine wave with respect to angle φ (namely, "sin φ"), at a predetermined ratio α. The angle φ is the angle for determining the outer radius Rm(φ) of the resolver rotor 2, and is an angle representing the outer radius of the resolver rotor 2 in polar coordinates with the reference position at zero degree. Accordingly, the angle φ differs from the rotation angle θ of the resolver rotor 2 when the resolver 1 outputs a signal.

The first function Gp(φ) is a function of the air gap when it is assumed that the resolver rotor 2 is an eccentric circle. That is, the first function Gp(φ) is a function that indicates the radial length of the air gap when it is assumed that the outer peripheral surface 11 of the resolver rotor 2 is aligned with the reference cylindrical surface 12 (the eccentric circle indicated by the dashed line in FIG. 1). If the resolver rotor 2 is an eccentric circle, the size of the air gap (radial length) is proportional to sin φ.

In the present embodiment, the resolver rotor 2 in an axial view is line-symmetric with respect to an symmetry axis indicated by a dashed and single-dotted line Z in FIG. 1 where, in the illustrated state (in the rotation position), the air gap on the right side is set to a maximum gap, while the air gap on the left side is set at a minimum gap. In the following, the maximum value of the air gap (maximum distance) will be referred to as a "maximum gap Gmax", and the minimum value of the air gap (minimum distance) will be referred to as a "minimum gap Gmin".

In the present embodiment, the resolver rotor 2 has the axial double angle of 1. Accordingly, when the amount of eccentricity of the eccentric axis Ce from the rotation center C is y, the maximum gap Gmax and the minimum gap Gmin can be expressed by the following expressions (9A), (9B), respectively, where, as noted above, Rs is the stator inner radius and Rr is the rotor reference radius. The thickness (axial length) of the resolver rotor 2 is constant.

$$G\text{max}=Rs-Rr|y \quad (9A)$$

$$G\text{min}=Rs-Rr-y \quad (9B)$$

The first function Gp(φ) can be mathematically represented by the following expression (10). The maximum gap Gmax and the minimum gap Gmin are set in advance based on the specifications of the resolver 1.

$$Gp(\phi)=\{(G\text{max}-G\text{min})\sin\phi\}/2+(G\text{min}+G\text{max})/2 \quad (10)$$

On the other hand, the second function Gip(φ) is a function where the inverse of the air gap (i.e., "1/air gap") is proportional to sin φ, and is expressed by the following expression (11).

$$Gip(\phi) = \cfrac{1}{\left[\left\{\cfrac{\cfrac{1}{G\text{min}} - \cfrac{1}{G\text{max}}}{2}\right\}\sin\phi + \cfrac{\cfrac{1}{G\text{min}} + \cfrac{1}{G\text{max}}}{2}\right]} \quad (11)$$

In addition, when the second function Gip(φ) is blended with respect to the first function Gp(φ) at the predetermined ratio α, the air gap Gm(φ) is expressed by the following expression (12). Hereafter, the air gap Gm(φ) will be referred to as "air gap Gm(φ) after synthesis".

$$Gm(\phi)=\alpha \times Gip(\phi)+(1-\alpha) \times Gp(\phi) \quad (12)$$

Thus, the outer radius Rm(φ) by which the outer peripheral surface 11 of the resolver rotor 2 is defined is determined by subtracting from the stator inner radius Rs the air gap Gm(φ) after synthesis. That is, the outer radius Rm(φ) is calculated according to the following expression (13), based on the stator inner radius Rs, the ratio α, the first function Gp(φ), and the second function Gip(φ) (angle φ, and the maximum air gap Gmax and the minimum air gap Gmin set in advance).

$$Rm(\phi) = Rs - Gm(\phi) \quad (13)$$
$$= Rs - \{\alpha \times Gip(\phi) + (1 - \alpha) \times Gp(\phi)\}$$

The reason why the third-order harmonic component can be reduced when the resolver rotor 2 has the outer peripheral surface 11 defined by the outer radius $Rm(\varphi)$ obtained by blending the second function $Gip(\varphi)$ with respect to the first function $Gp(\varphi)$ at the predetermined ratio $\alpha$ will be described.

In a resolver magnetic circuit, permeance is predominated by air gap. Thus, the greater the air gap, the smaller the permeance becomes, and the smaller the air gap, the greater the permeance becomes. That is, permeance may be considered to be proportional to the inverse of air gap. Accordingly, it may be considered that the first function $Gp(\varphi)$ is a function where the permeance is proportional to the inverse of sin $\varphi$ (1/sin $\varphi$), and that the second function $Gip(\varphi)$ is a function where the permeance is proportional to sin $\varphi$. In other words, because permeance is proportional to inductance, it may be said that the first function $Gp(\varphi)$ is a function where the inductance is proportional to the inverse of sin $\varphi$ (1/sin $\varphi$), and that the second function $Gip(\varphi)$ is a function where the inductance is proportional to sin $\varphi$.

Figure 4A:
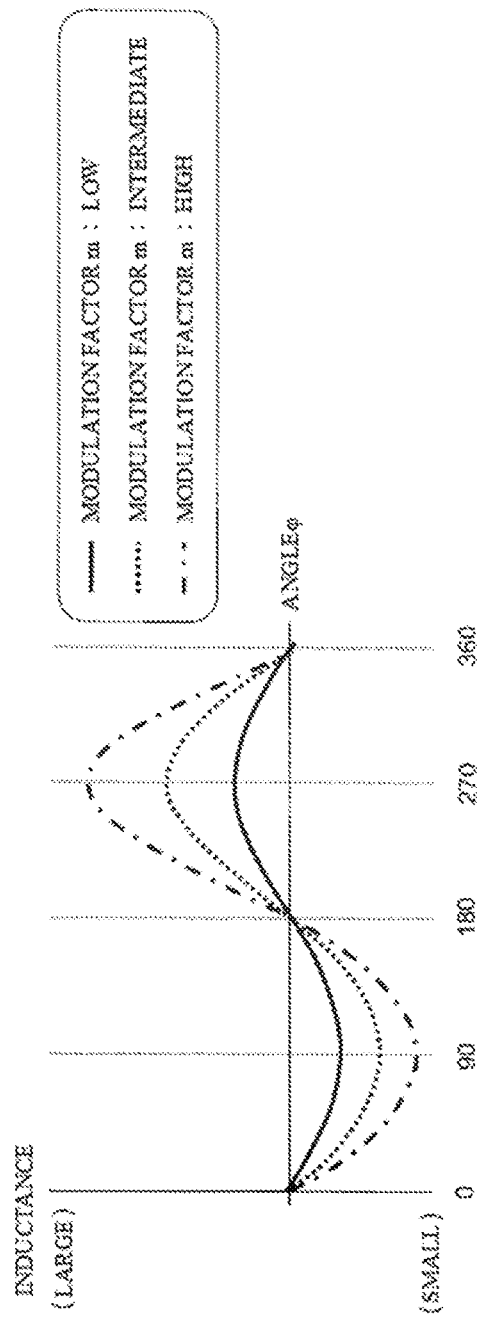
FIG. 4A is a graph showing the results of backward calculation of an ideal inductance waveform when the resolver signal is a sine wave (i.e., as calculated under the condition of zero harmonic component)
Figure 4B:
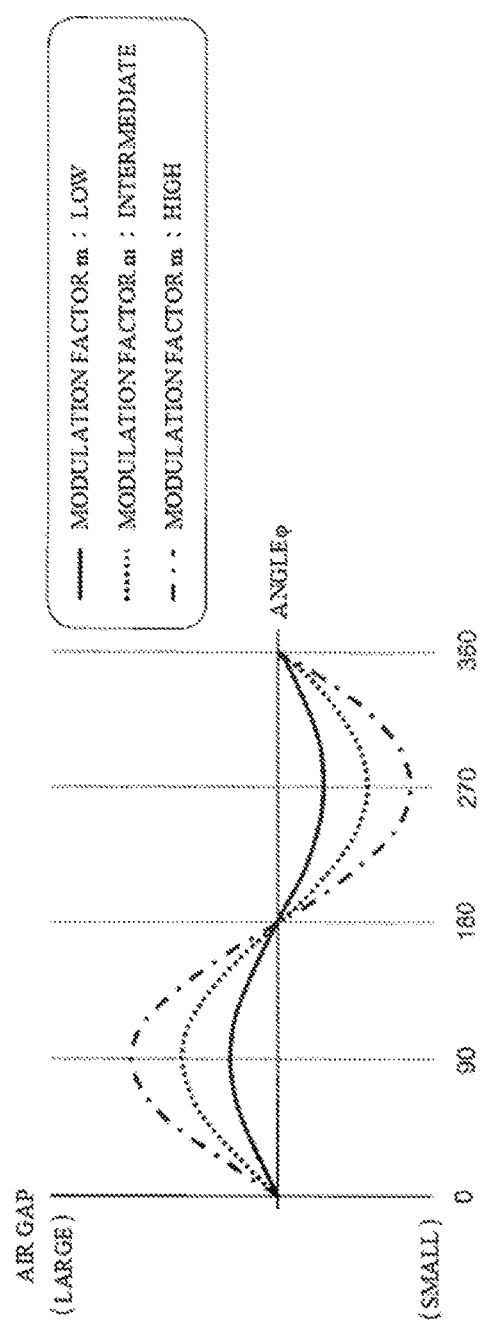
FIG. 4B is a graph indicating the relationship of air gap with respect to the angle φ when the waveforms of FIG. 4A are obtained.

When an ideal inductance waveform when the resolver signal is a sine wave (i.e., assuming that there is no harmonic component) is calculated backward, substantially sine wave shapes are obtained, as illustrated in FIG. 4A. However, the shape of the ideal inductance waveform varies depending on the magnitude of a modulation factor $m(=b/a)$ representing a variable amplitude b of the resolver signal to an average value a of the resolver signal. Specifically, the smaller the modulation factor m, the closer the inductance waveform will be to a sine wave; conversely, the greater the modulation factor m, the more sharply the inductance waveform will rise at the angle where the air gap is narrowed as a modification of a sine wave. Inductance is proportional to permeance, and the permeance may be considered proportional to the inverse of the air gap. Accordingly, the relationship is such that when the inductance waveforms are as illustrated in FIG. 4A, the air gap is as illustrated in FIG. 4B. That is, when the modulation factor m is high, the shape is close to the waveform of the second function $Gip(\varphi)$; conversely, when the modulation factor m is low, the shape is close to the waveform of the first function $Gp(\varphi)$.

Accordingly, by appropriately blending the second function $Gip(\varphi)$, which is the function where the inductance is proportional to sin $\varphi$, with the first function $Gp(\varphi)$, which is the function where the inductance is proportional to the inverse of sin $\varphi$, an inductance waveform close to being ideal can be obtained. As a result, the error due to the harmonic components of the resolver signal can be decreased. The blending ratio $\alpha$ is set to a greater value as the modulation factor m becomes smaller, and to a smaller value as the modulation factor m becomes higher. That is, in order to obtain a resolver signal in which the harmonic components are reduced, the second function $Gip(\varphi)$ is made increasingly dominant as the modulation factor m becomes smaller, and the first function $Gp(\varphi)$ is made increasingly dominant as the modulation factor m becomes higher.

Figure 5:
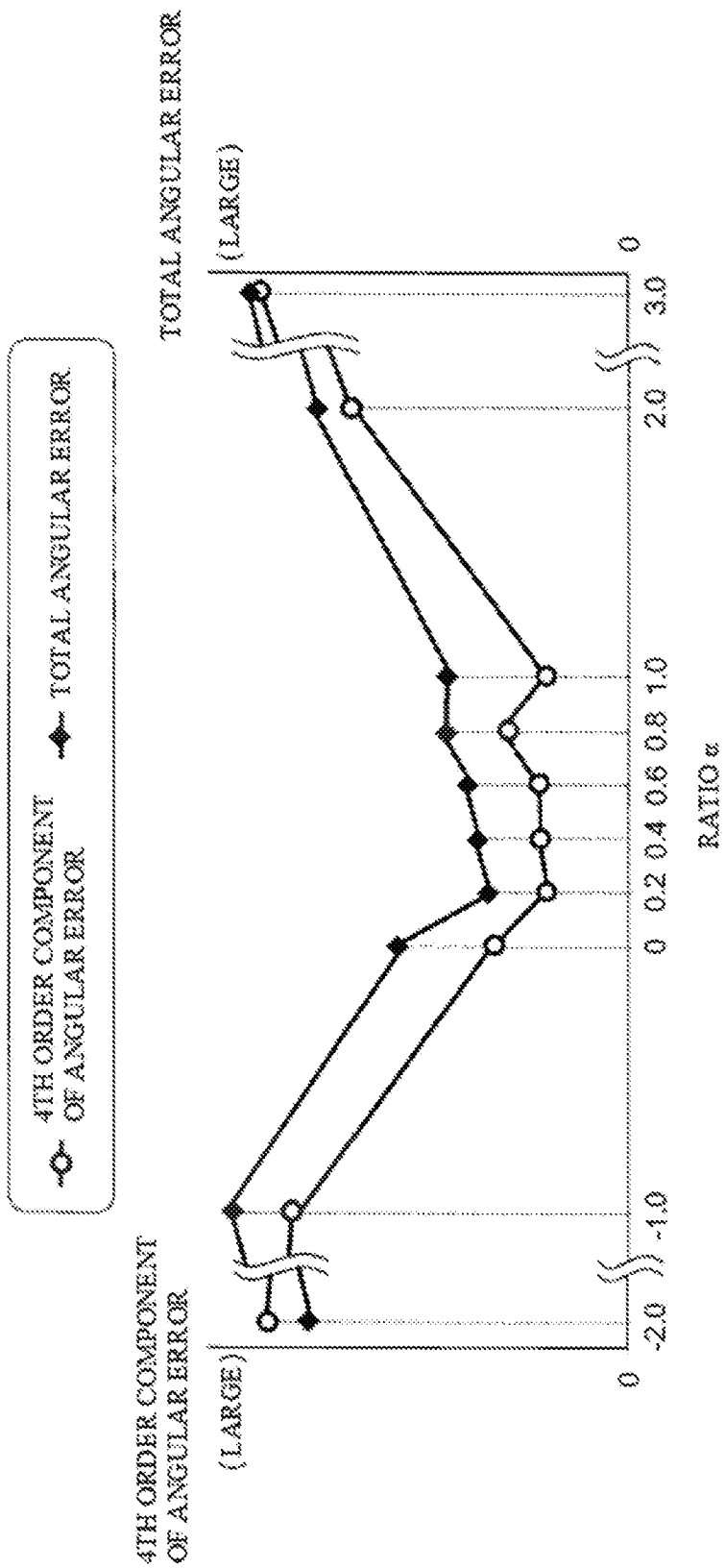
FIG. 5 is a graph showing by way of example the results of actual measurement of the fourth-order component of angular error and a total angular error at various ratios.

FIG. 5 illustrates the results of measurement of the fourth-order harmonic component of angular error and the total angular error when the ratio $\alpha$ was varied from −2.0 to 3.0 in order to analyze the optimum value of the ratio $\alpha$. As illustrated in FIG. 5, the ratio $\alpha$ is not limited to positive values but may have negative values. However, when the ratio $\alpha$ is made zero, the second function $Gip(\varphi)$ is not blended. Thus, the ratio $\alpha$ is set to a value other than zero, and preferably a value greater than zero. In the graph of FIG. 5, only the ratio $\alpha$ is varied, with the rotor reference radius Rr and the amount of eccentricity y being constant. Because the rotor reference radius Rr and the amount of eccentricity y are constant, the maximum gap Gmax and the minimum gap Gmin also become constant, and the modulation factor $m(=b/a)$ also becomes substantially constant. The thickness of the resolver rotor 2 is also set to be constant.

As noted above, the second term $[-2d \cdot \cos 2\pi t(fe+3fm)]$ in the right-hand side of expression (8) is the error component due to a harmonic component of the resolver signal (third-order harmonic component). When the error component is included, an angular error component (fourth-order component of angular error) is detected in the resolver 1. Thus, in order to reduce the total angular error of the resolver 1, it is important to reduce the fourth-order component of angular error, as indicated by blank dots in FIG. 5.

According to the graph shown in FIG. 5, compared with when the value of the ratio $\alpha$ is not more than zero (negative value) or more than 1.0, the fourth-order component of angular error is reduced and the total angular error also becomes smaller when the ratio $\alpha$ is not less than 0.2 and not more than 1.0. Thus, the ratio $\alpha$ is set to a value not less than 0.2 and not more than 1.0. In addition, in this range ($0.2 \le \alpha \le 1.0$), it is preferable to set an appropriate ratio $\alpha$ by taking the modulation factor m into consideration. For example, it is preferable to make adjustments, such as setting the ratio $\alpha$ to a large value when the modulation factor m is small (such as 0.07), and setting the ratio $\alpha$ to a small value when the modulation factor m is high (such as 0.5).

2. Operation and Effects (1) In the resolver 1, the outer peripheral surface 11 of the resolver rotor 2 is defined by the outer radius $Rm(\varphi)$ obtained by appropriately blending the second function $Gip(\varphi)$ with respect to the first function $Gp(\varphi)$ at a predetermined ratio $\alpha$. In this way, it becomes possible to obtain an output waveform close to being an ideal inductance waveform having no harmonic component. As a result, the error due to the harmonic components of the resolver signal can be decreased, and the accuracy of rotation angle detection can be improved.

(2) In the resolver 1, the modulation factor m is greater than zero, and the ratio $\alpha$ is set to a greater value as the modulation factor m becomes smaller; conversely, the ratio $\alpha$ is set to a smaller value as the modulation factor m becomes higher. By thus adjusting the ratio $\alpha$ in accordance with the modulation factor m, it becomes possible to obtain a resolver signal having reduced harmonic components, whereby the accuracy of rotation angle detection can be improved.

(3) When the ratio $\alpha$ is set to a value not less than 0.2 and not more than 1.0, the fourth-order component of angular error can be decreased, whereby the accuracy of rotation angle detection can be improved.

(4) In the resolver 1, the resolver rotor 2 has the outer peripheral surface 11 defined by the outer radius $Rm(\varphi)$ calculated according to expression (13). Because the stator inner radius Rs, the maximum air gap Gmax and the minimum air gap Gmin are values that are determined in advance, it is possible to design the resolver rotor 2 (resolver 1) having the outer peripheral surface 11 for which the optimum outer radius Rm(φ) is defined by adjusting the ratio α.

(5) The resolver 1 has the axial double angle of 1. Accordingly, the configuration of the resolver 1 is simplified. In addition, absolute angles can be detected, and the resolver 1 can be applied in the motor 9 having various pole numbers. In other words, the resolver 1 of one specification can be used flexibly, regardless of the pole number of the motor 9.

(6) In the motor 9 equipped with the resolver 1, the rotation angle of the resolver rotor 2 (i.e., the shaft 4) can be detected with high accuracy. This makes it possible to implement various controls, such as position control and speed control, with high accuracy.

In the resolver 1, on the salient poles 31 of the resolver stator 3, only the input coils 5 are wound. Accordingly, compared with a conventional resolver in which output coils are also provided, the winding configuration can be simplified. If the winding wires are not wound in the same manner with respect to all of the salient poles in the resolver, the amount of magnetic flux linking the winding wires would vary depending on the position of the winding wire (salient pole), resulting in a rotation angle detection error. Thus, if the resolver has a complex winding wire configuration (such as a resolver having input and output winding wires), the steps or equipment for winding the winding wires in the same manner with respect to all of the salient poles would become complex, likely resulting in an increase in manufacturing cost. In contrast, with the resolver 1 having a simple winding wire configuration as described above, it becomes possible to increase the accuracy of rotation angle detection while limiting the manufacturing cost.

3. Others

The configuration of the resolver 1 described above is merely an example and not intended to be limiting. For example, the above-described structure of the resolver rotor 2 may be applied in a resolver in which the axial double angle is other than 1. In the case of a resolver in which the axial double angle is other than 1, the central axis of the resolver rotor is aligned with the rotation center C, and the maximum air gap Gmax and the minimum air gap Gmin are set. In this case, too, effects similar to those of the foregoing embodiment can be obtained when the resolver rotor has an outer peripheral surface defined by the outer radius Rm(φ) obtained by blending, with respect to the first function Gp(φ) where the air gap is proportional to a sine wave (sin φ), the second function Gip(φ) where the inverse of the air gap is proportional to a sine wave (sin φ), at the ratio α. The above-described method for determining the ratio α is merely an example and is not intended to be limiting.

The end face 31g of the wall portion 31f of the teeth 31e may have a shape (non-arc shape) such that the end face as a whole is not equidistant with respect to the rotation center C. In this case, the outer peripheral surface of the resolver rotor 2 may be designed so as to be defined, on the teeth center line (line passing the rotation center C) on the end face 31g of the teeth 31e, by the outer radius Rm(φ) obtained by blending, with respect to the first function Gp(φ) where the air gap between the end face 31g and the resolver rotor 2 is proportional to a sine wave (sin φ), the second function Gip(φ) where the inverse of the air gap is proportional to a sine wave (sin φ), at the ratio α.

The structure of the resolver stator 3 described above is merely an example, and the shape of the salient poles 31A to 31D may be other than described. While the foregoing embodiments have been described with reference to the case where the resolver rotor 2 has a laminated structure, the resolver rotor 2 may not have a laminated structure. The circuit configuration described above is also an example, and circuitry other than the described configuration may also be provided.

What is claimed is:

1. A resolver comprising:
a resolver rotor fixed to a rotating shaft; and
a resolver stator disposed around the resolver rotor, wherein:
the resolver stator includes an annular stator core which has a plurality of salient poles protruding radially inward and which is disposed at regular intervals in a circumferential direction;
the resolver rotor has an outer peripheral surface defined by an outer radius obtained by blending, with respect to a first function where an air gap between the resolver rotor and the salient poles is proportional to a sine wave related to an angle of the resolver rotor, a second function where an inverse of the air gap is proportional to the sine wave, at a predetermined ratio;
the ratio is set greater than zero; and
the outer radius is calculated according to an expression (A), based on the angle, a stator inner radius indicating a length from a center of rotation of the shaft to a radially inner end face of the salient poles, the ratio, and a maximum value and a minimum value of the air gap set in advance:

$$Rm(\phi) = Rs - \{\alpha \times Gip(\phi) + (1 - \alpha) \times Gp(\phi)\} \quad (A)$$

$$Gp(\phi) = \{(Gmax - Gmin)\sin\phi\}/2 + (Gmin + Gmax)/2$$

$$Gip(\phi) = \cfrac{1}{\left[\left\{\cfrac{\cfrac{1}{Gmin} - \cfrac{1}{Gmax}}{2}\right\}\sin\phi + \cfrac{\cfrac{1}{Gmin} + \cfrac{1}{Gmax}}{2}\right]}$$

Rm(φ): Outer radius
φ: Polar coordinate angle of resolver rotor outer radius
Rs: Stator inner radius
α: Ratio
Gp(φ): First function
Gip(φ): Second function
Gmax: Maximum value of air gap
Gmin: Minimum value of air gap.

2. The resolver according to claim 1, wherein the ratio is set to a greater value as a modulation factor representing a variable amplitude of an output signal from the resolver with respect to an average value of the output signal becomes smaller.

3. The resolver according to claim 1, wherein the ratio is set to a value not less than 0.2 and not more than 1.0.

4. The resolver according to claim 1, wherein the resolver has an axial double angle of 1.

5. A motor comprising:
a housing;
the resolver according to claim 1;
a rotor integrally rotated with the shaft; and
a stator fixed to the housing.

* * * * *